May 22, 1956     L. V. GUILD     2,746,845
CARBON TRAIN

Filed Nov. 13, 1951     3 Sheets-Sheet 1

INVENTOR.
Lloyd V. Guild
BY
HIS ATTORNEYS

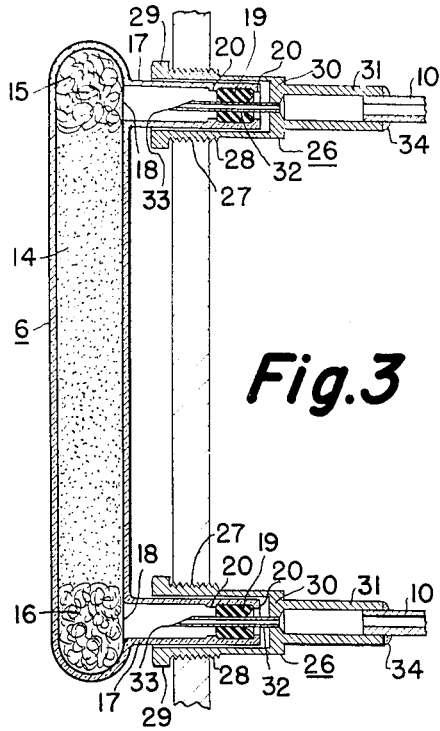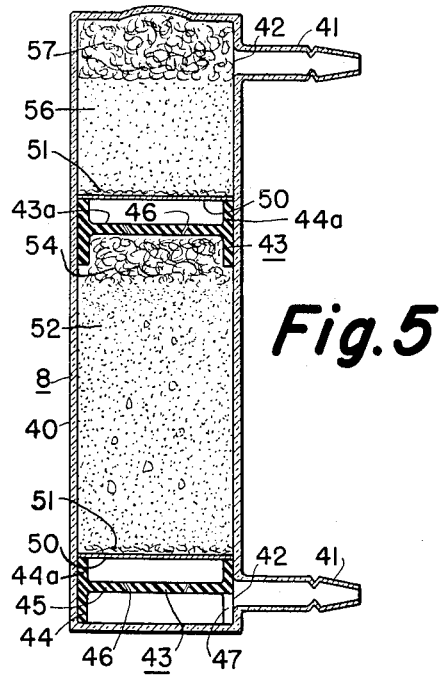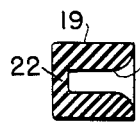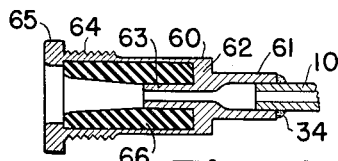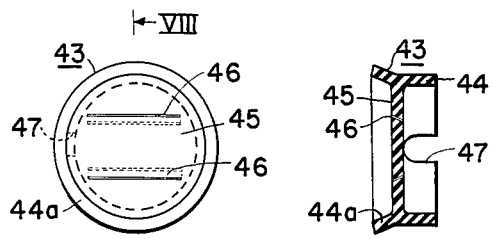

May 22, 1956 L. V. GUILD 2,746,845
CARBON TRAIN

Filed Nov. 13, 1951 3 Sheets-Sheet 3

INVENTOR.
Lloyd V. Guild
BY
HIS ATTORNEYS

United States Patent Office 2,746,845
Patented May 22, 1956

2,746,845

CARBON TRAIN

Lloyd V. Guild, Library, Pa.

Application November 13, 1951, Serial No. 255,928

3 Claims. (Cl. 23—254)

This invention relates to a carbon train for analyzing carbon by combustion of a sample and passage of the gases of combustion through the carbon train.

The analysis for carbon in metals is an essential requirement in many metallurgical processes. A standard method of analysis for the carbon content has been in common use among steel chemists for many years. While many variations and modifications are in use, the essentials of the analysis procedure are as follows: A weighed sample of metal is placed in a tube-type furnace at approximately 2000° F., and burned in a stream of oxygen. The gaseous products of combustion consist of carbon dioxide, oxides of sulphur, and water vapor mixed with excess oxygen. The carbon dioxide present is due to the combustion of the carbon in the sample, and represents a measure of the carbon content of the metal. The oxides of sulphur and water vapor are removed chemically. The carbon dioxide is then removed chemically in a weighed container, and the quantity of carbon dioxide determined gravimetrically by the increase in weight. This is used to determine the per cent of carbon in the sample in a known manner.

The equipment used is generally considered in terms of the combustion furnace for the combustion of the samples and the absorption vessels for the removal of water vapor, oxides of sulphur and carbon dioxide. The combination of absorption vessels is generally referred to as the carbon train. The present invention relates to an improvement in carbon trains.

In the accompanying drawings which illustrate preferred embodiments of my invention, Figure 1 is a front elevation of a carbon train mounted on a mounting panel, the drawing being somewhat diagrammatic;

Figure 3 is a vertical section taken on the line III—III of Figure 2;

Figure 4 is a vertical sectional detail of a resilient plug used for sealing a cartridge;

Figure 5 is a longitudinal section through a cartridge for absorbing $CO_2$;

Figure 6 is a longitudinal section through one of the fittings used for mounting the cartridge of Figure 5 on a mounting panel;

Figure 7 is a plan view of one of the resilient diaphragms used in the cartridge shown in Figure 5;

Figure 8 is a vertical section taken on the line VIII—VIII of Figure 7;

Figure 1:
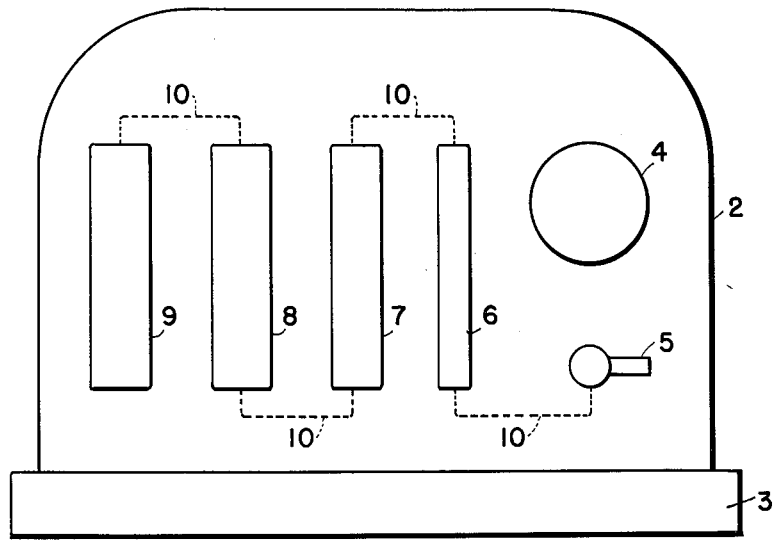
Figure 2:
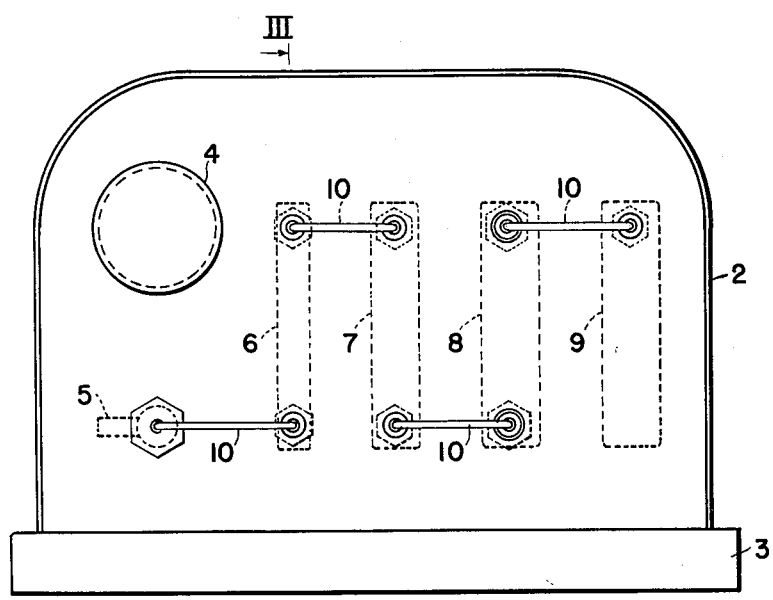
Figure 2 is a rear elevation of the apparatus shown in Figure 1.

The elements of carbon trains heretofore used have been assembled rather haphazardly and consisted of isolated absorption vessels or cartridges connected together with rubber tubing and rubber stoppers. The disadvantages of such a train are as follows:

1. Since the elements of the train merely rested on a support, it was easily upset and glass parts broken.

2. The excessive volume of the train required prolonged flushing and thus increased the time of the analysis.

3. The train was difficult to maintain free from leaks, causing errors in the analysis.

4. Selective solubility of carbon dioxide in the rubber connections sometimes caused errors in the analysis of samples of high carbon content.

5. It was difficult to renew the chemical absorbents used in the various cartridges of the train.

6. An unnecessarily large amount of space was required for the complete train.

The train hereinafter described eliminates or reduces the disadvantages listed above. In accordance with my invention, the carbon train is mounted on a mounting panel so that it cannot be upset. Due to the mounting of the carbon train on a supporting panel, the parts can be mounted close together, thereby reducing the volume of the tubing connecting the different cartridges. The connections between the various cartridges can be made gas-tight and metal tubing may be used to connect the various cartridges, thereby eliminating the use of rubber tubing, which may cause errors in analysis due to solubility of carbon dioxide in the rubber.

Referring to the accompanying drawings, and for the present to Figures 1-4, a metal panel 2 is mounted on a base 3. An electric timing device 4 used for controlling the time of combustion and the flushing of the train is mounted on the panel 2. The inlet 5 to the carbon train is connected to the combustion furnace by a short rubber tube connection not shown. Four glass absorption vessels or cartridges 6, 7, 8 and 9 are mounted on the panel 2 in a manner described more particularly hereinafter. The cartridge 6 contains a material such as manganese dioxide for the removal of the oxides of sulphur. Cartridge 7 contains a material such as phosphorous pentoxide or magnesium perchlorate for the removal of water vapor. Cartridge 8 contains a material such as soda lime or "Ascarite," which is a sodium hydroxide-asbestos preparation, the function of which is to absorb carbon dioxide. Vessel 9 is a sulphuric acid trap sealing the train from the atmosphere and is so constructed as to prevent the sucking of any air back into the absorption cartridge 8. The various parts of the carbon train are connected as shown by the dotted lines 10 of Figure 1. These connections 10 between the various vessels 6—9 are made of metal tubing which is welded to metal fixtures supported by the panel 2 as more particularly described hereinafter.

Referring more particularly to Figures 3 and 4, the cartridge 6 is cylindrical in cross-section and is made of glass. It contains a body of material 14 such as manganese dioxide for absorbing the oxides of sulphur. Wads of glass wool 15 and 16 are placed in the cartridge 6 above the absorbent material 14. The filling of the cartridge 6 is done while the top is open, and thereafter the top is closed. The cartridge 6 has two side arms 17 extending therefrom, each side arm having an opening 18 communicating with the interior of the cartridge 6. A rubber or "neoprene" plug 19 is inserted into the end of each of the side arms, being retained therein between inwardly extending projections 20 of the side arms. The plug 19 is shown removed from the side arms in Figure 4. It has a bore 21 extending only part way through the length of the plug, thereby providing a thin diaphragm portion 22.

The cartridge 6 is mounted on the panel 2 by means of metal fittings, indicated generally by reference numeral 26. The panel 2 is provided with threaded holes 27, which receive the threaded portion 28 of the fittings 26. Each fitting has a head 29 for screwing it into the hole in the panel. The fitting 26 has a base 30 to which is secured a metal tube 31 of somewhat smaller diameter than the fitting 26. A hollow tube or needle 32 having a sharpened end 33 is secured to the base 30. The metal tubes 10 are soldered, as indicated by reference numeral 34, to the metal tubes 31.

When the side arms 17 of the cartridge 6 are inserted into the fittings 26, as shown in Figure 3, the hollow needle 32 punctures the thin diaphragm part 22 of the rubber plug 19, thus establishing communication between the interior of the cartridge 6 and the metal tubes 10 while sealing the cartridge from the atmosphere.

Figure 10:
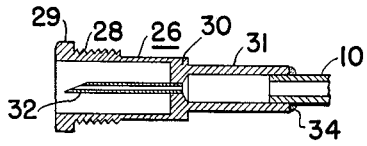
Figure 10 is a longitudinal section of one of the fittings for mounting the sulphuric acid trap shown in Figure 9 on a mounting panel.
Figure 12:
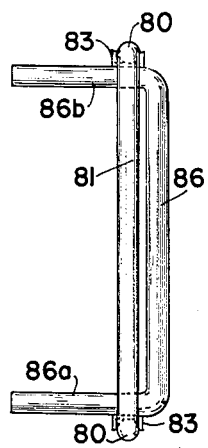
Figure 12 is an end elevation and Figure 13 is a side elevation of the cartridge puller shown in Figure 11.
Figure 11:
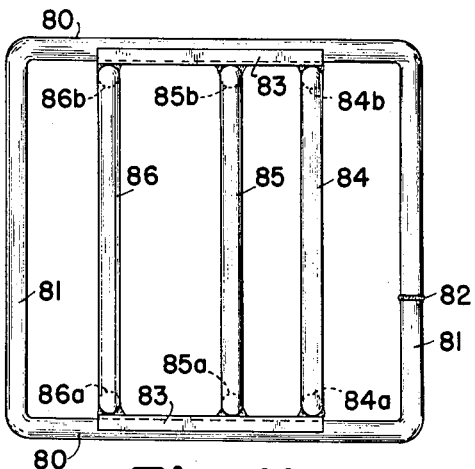
Figure 11 is a plan view of a cartridge puller for removing a cartridge from its mounting panel.

The cartridge 7 for removing moisture and the sulphuric acid trap or vessel 9 are mounted on the panel 2 in the same manner as is shown in Figure 3 for the cartridge 6, which is used for the removal of oxides of sulphur from the gas. The fittings 26 for receiving the side arms of vessels 7 and 9 are identical to that shown in Figure 3, and is shown by itself in Figure 10.

The absorption tower or cartridge 8 for absorbing $CO_2$ is shown in Figures 5, 7 and 8 and one of the fittings used for supporting it on the panel 2 is shown in Figure 6. Referring to these figures, the $CO_2$ cartridge 8 consists of a glass vessel 40, provided adjacent its top and bottom with side arms 41 having openings 42 communicating with the interior of the cartridge. In the bottom end of the cartridge is a "neoprene" or rubber piece 43 constructed as shown in Figures 7 and 8. It consists of a ring 44 molded to a diaphragm 45 having two slits 46 cut in it. The upper part 44a of the ring 44 is enlarged and fits tightly against the inside of the tube 40. A portion of the lower part of the ring 44 is cut away to provide an opening 47, which lies adjacent the opening 42 in the lower side arm 41. A metal or plastic gauze piece 50 is placed on top of the rubber piece 43 and a small portion 51 of glass wool is placed on top of the gauze 50. The absorbent 52 for $CO_2$ is placed on top of the glass wool 51. This absorbent can be soda lime or "Ascarite" or any one of a number of commercially available absorbents. On top of the absorbent 52 is a layer 54 of glass wool, and then there is another or upper diaphragm piece 43a. The upper diaphragm piece 43a is similar to the lower diaphragm piece 43 except that it does not have the opening 47. A piece 50 of gauze is placed on top of the upper diaphragm piece 43a and a small portion 51 of glass wool is placed on the gauze 50. Above the glass wool 51 is a body 56 of a material such as phosphorous pentoxide or magnesium perchlorate which absorbs moisture. A body 57 of glass wool is placed above the drier material 56.

The $CO_2$ absorbent body 52 is usually either sodium or potassium hydroxide in some form, which reacts with the carbon dioxide in the gas according to the following equation:

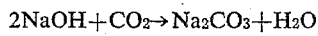

$$2NaOH + CO_2 \rightarrow Na_2CO_3 + H_2O$$

It can be seen that water is formed from the reaction. The purpose of employing the drier 56 is to prevent any of this water from being carried off and thus changing the weight, which would lead to an inaccurate analysis.

A certain amount of moisture is required in the $CO_2$ absorbent material 52 in order to have an active absorbent. On long standing, the drier 56 will remove the moisture from the $CO_2$ absorbent 52, causing the cartridge to be inactive, and also destroying the capacity of the drier to retain the moisture formed in the reaction according to the equation above given. For these reasons, prior known $CO_2$ absorbents cannot be stored over long periods of time, but must be used fresh. A cartridge for absorbing $CO_2$, constructed in accordance with my invention as just described in connection with Figures 5–7, can be stored over long periods and still maintain its effectiveness when put into use. The purpose of the upper diaphragm 43a shown in Figure 5 is to seal off the $CO_2$ absorbent 52 from the drier 56 when the cartridge is not in use. When the cartridge is in use, the outlet gases from the combustion furnace enter the inlet of the cartridge through the lower side arm 41, and due to the increased pressure, the slits 46 in the lower diaphragm 43 open, allowing the passage of gases upwardly through the $CO_2$ absorbent 52, through the opened slits in the upper diaphragm 43a and through the drier 56. However, when the cartridge is not in use, the pressure within the cartridge is reduced, and the slits 46 in the upper and lower diaphragm members 43 and 43a are closed, thereby causing the diaphragm member 43a to seal off the drier 56 from the $CO_2$ absorbent 52. The diaphragm 43 which is located in the bottom of the cartridge 8 serves to keep the absorbent 52 away from the inlet in the lower side arm 41, and also serves in use to break up the gas stream and to prevent channeling as the gases pass through the cartridge.

Since the $CO_2$ absorbent cartridge 8 shown in Figure 5 must be removed from the carbon train for weighing after each carbon analysis, a different type of fitting from that shown in Figure 3 is used for mounting the cartridge 8 on the panel 2. The fitting for cartridge 8 is shown in Figure 6. The fitting comprises a metal tube 60 and a metal tube 61 of somewhat smaller diameter, joined together at 62 and provided with a forwardly extending portion 63. The tube 60 is threaded as shown by reference numeral 64 and is provided with a head 65 for threading the fitting into a threaded hole in the panel 2. A "neoprene" or rubber sleeve 66 fits within the tube 60, and is fitted at its base between the tube 60 and the tube 63. Tight seals are made by forcing the side arms 41 into contact with the resilient sleeve 66 of the fittings. The cartridge can be easily removed from the fittings for weighing.

Figure 9:
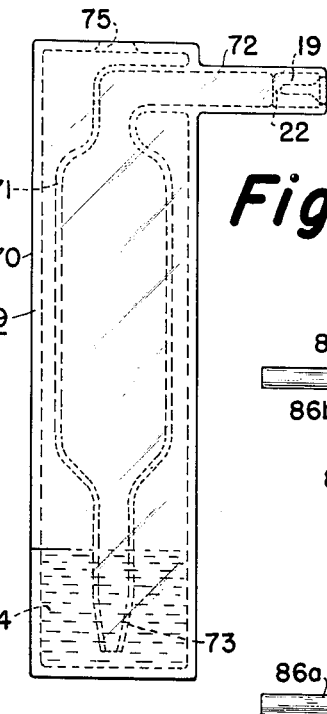
Figure 9 is a front elevation of a sulphuric acid trap.

The sulphuric acid trap 9 is shown in Figure 9. It is normally made of glass, and consists of an outside cylindrical section 70 and an interior bulb section 71, the bulb section having a side arm 72 providing a gas inlet. This inlet is closed by a rubber or "neoprene" plug 19 having a thin diaphragm portion 22, which is pierced by the hollow needle 32 as previously explained when the side arm 72 is forced into the fitting 26 shown in Figure 10. The bottom 73 of the bulb 71 extends downwardly into a body 74 of sulphuric acid. The acid is introduced into the outer cylinder 70 through an opening 75. The gas enters the side arm 72, passes down through the bulb section 71, bubbles through the sulphuric acid 74 and then passes out through openings 75. By providing the enlarged bulb section 71, if a partial vacuum is formed at the inlet 72, the sulphuric acid will not be drawn back into the carbon train but will be drawn back only into the bulb 71.

Figure 14:
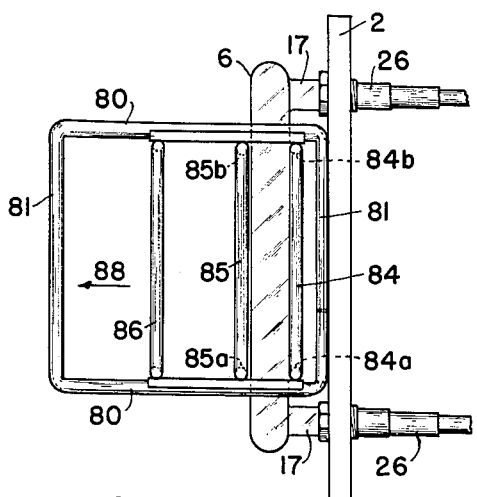
Figure 14 illustrates the manner in which the cartridge puller is used for removing a cartridge from its mounting panel.
Figure 13:
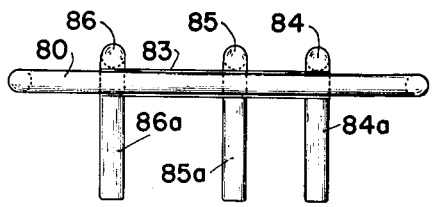

A cartridge puller, that is a device for withdrawing the side arms of the cartridges from the fittings 26 secured to the panel 2, and thereby removing the cartridges from the panel, is shown in Figures 11–14. The cartridge puller is shown by itself in Figures 11–13, and its application in removing a cartridge is shown in Figure 14. It comprises a generally rectangular frame made from a tube or rod bent to form side members 80 and end members 81 connected at 82. Mounted to slide longitudinally within the frame is a slide member comprising two channel members 83 adapted to slide along the side members 80. Three cross members which may be made conveniently of tubing or rods, designated 84, 85 and 86, extend transversely of the frame and provide means for moving the slide relative to the frame. The ends of the cross members 84–86 are bent downwardly at substantially right angles to the plane of the frame to form the legs 84a, 85a and 86a at one side of the frame and the legs 84b, 85b and 86b at the other side of the frame. The cross members are welded at each end to the slides 83. The cross members 84, 85 and 86 are spaced longitudinally of the frame a distance substantially equal to but slightly greater than the diameter of the cartridge to be removed. Since in the present instance, the cartridges are not all of the same diameter, the spacing between the cross members 84 and 85 is different from that of cross members 85 and 86.

In removing a cartridge 6 from its supporting panel 2, the cartridge puller is placed in the position shown in Figure 14 with an end 81 of the frame resting against the panel 2 between the side arms 17 of the cartridge 6, and with the legs 84b and 85b straddling the cartridge adjacent the upper side arm 17 and the legs 84a and 85a straddling the cartridge 6 adjacent the lower side arm 17. The slide is then moved in the direction indicated by the arrow 88, thereby withdrawing the side arms 17 from the fittings 26. The cartridge puller enables one to withdraw each side arm of a cartridge from its fitting evenly without danger of exerting an uneven pull on the cartridge which might result in breakage of the glass side arms 17 in withdrawing them from their fittings. It will be noted that the legs 84a and 84b of a pair of legs are in alignment transversely of the frame so that substantially equal pressure is exerted on the cartridge adjacent the upper and lower side arms 17 when the slide is moved relative to its frame in order to remove a cartridge from its mounting.

The invention is not limited to the preferred embodiments, but may be otherwise embodied or practiced within the scope of the following claims.

I claim:

1. In a carbon train for analyzing carbon by combustion of a sample and passage of the gasses of combustion through the carbon train, a mounting panel having holes extending through it, fittings received in said holes and secured to said panel, a cartridge containing an absorbent for a constituent of the gas to be passed therethrough, said cartridge having integral side arms extending in the same direction from the cartridge end extending through the holes in said panel and received in said fittings, a resilient plug in the outer end of each side arm, and a hollow needle secured to and immovable relative to said fitting and adapted to pierce said resilient plug when said side arms are inserted in said fittings.

2. A carbon train according to claim 1, in which said resilient plug is formed with a bore extending only part way through the plug so as to leave a thin diaphragm adapted to be pierced by said hollow needle.

3. In a carbon train for analyzing carbon by combustion of a sample and passage of the gases of combustion through the carbon train, a mounting panel having holes extending through it, fittings received in said holes and secured to said panel, a cartridge containing an absorbent for a constituent of the gas to be passed therethrough, said cartridge having integral side arms extending in the same direction from the cartridge and extending through the holes in said panel and received in said fittings, a resilient plug in the outer end of each side arm, the side arms being provided with inwardly extending projections for maintaining the plugs in the side arms, and a hollow needle secured to and immovable relative to said fittings and adapted to pierce said resilient plug when said side arms are inserted in said fittings.

References Cited in the file of this patent

UNITED STATES PATENTS

| | | |
|---|---|---|
| 686,642 | Wayte | Nov. 12, 1901 |
| 970,923 | Hinman | Sept. 20, 1910 |
| 1,448,901 | Moreland | Mar. 20, 1923 |
| 1,503,823 | Finkl | Aug. 5, 1924 |
| 1,542,015 | Strickland | June 16, 1925 |
| 1,714,245 | Schaefer | May 21, 1929 |
| 1,719,864 | Zimmerman | July 9, 1929 |
| 1,877,151 | Turner | Sept. 13, 1932 |
| 1,974,498 | Lewis | Sept. 25, 1934 |
| 2,045,866 | Morrison | June 30, 1936 |
| 2,402,781 | Schreiber | June 25, 1946 |
| 2,429,694 | King | Oct. 28, 1947 |
| 2,495,040 | Walden | Jan. 17, 1950 |
| 2,503,683 | Perkins | Apr. 11, 1950 |
| 2,546,273 | Poole | Mar. 27, 1951 |
| 2,568,210 | Whitney | Sept. 18, 1951 |
| 2,584,397 | Pitman | Feb. 5, 1952 |
| 2,616,796 | Schilling et al. | Nov. 4, 1952 |

OTHER REFERENCES

Tunnicliff et al.: "I. and E. Chem. Anal. Ed.," vol. 18, pages 710–712 of article which concludes on page 718 (1946).